(12) United States Patent
Pirone

(10) Patent No.: US 7,454,961 B2
(45) Date of Patent: Nov. 25, 2008

(54) SYSTEM AND METHOD FOR SENSING POSITION OF A MOTORCYCLE CRANKSHAFT

(76) Inventor: Tom Pirone, 43 Lamppost Dr., West Redding, CT (US) 06896

( * ) Notice: Subject to any disclaimer, the term of this patent is extended or adjusted under 35 U.S.C. 154(b) by 0 days.

(21) Appl. No.: 11/336,603

(22) Filed: Jan. 19, 2006

(65) Prior Publication Data

US 2007/0163336 A1    Jul. 19, 2007

(51) Int. Cl.
*G01M 15/00* (2006.01)

(52) U.S. Cl. .................................... 73/114.26

(58) Field of Classification Search .............. 73/114.02, 73/114.03, 114.04, 114.05, 114.24, 114.25, 73/114.26, 114.27, 114.28
See application file for complete search history.

(56) References Cited

U.S. PATENT DOCUMENTS

| 4,235,101 | A | | 11/1980 | Stadelmann | |
| 4,425,788 | A | * | 1/1984 | Franke et al. | 73/35.01 |
| 4,779,454 | A | * | 10/1988 | Fitzner et al. | 73/116 |
| 5,000,042 | A | * | 3/1991 | Luebbering | 73/119 A |
| 5,047,943 | A | * | 9/1991 | Takahata et al. | 701/101 |
| 5,113,693 | A | * | 5/1992 | Hata | 73/118.1 |
| 5,361,630 | A | | 11/1994 | Kowalski | |
| 5,894,763 | A | | 4/1999 | Peters | |
| 6,073,713 | A | * | 6/2000 | Brandenburg et al. | 180/65.2 |
| 6,131,547 | A | | 10/2000 | Weber et al. | |
| 6,164,159 | A | | 12/2000 | Saker | |
| 6,450,846 | B2 | * | 9/2002 | Morikami | 440/53 |
| 6,490,914 | B1 | * | 12/2002 | Brandenburg et al. | 73/117.3 |
| 6,499,341 | B1 | | 12/2002 | Lodise et al. | |
| 6,575,134 | B1 | | 6/2003 | Bowling | |
| 6,664,789 | B2 | | 12/2003 | Thomsen et al. | |
| 2006/0185427 | A1 | * | 8/2006 | Ono et al. | 73/118.1 |
| 2006/0201238 | A1 | * | 9/2006 | Trapasso et al. | 73/117.3 |

* cited by examiner

*Primary Examiner*—Eric S McCall

(57) ABSTRACT

A system and method allow the position of a motorcycle crankshaft to be sensed without causing oil froth or foam. A flywheel is arranged perpendicularly and concentrically with respect to the crankshaft, and an electronic sensor is positioned for sensing the face of the flywheel, which has a plurality of notches therein. The electronic sensor is equipped to sense passage of the notches past the sensor. The rim of the flywheel is toothless.

8 Claims, 3 Drawing Sheets

SYSTEM AND METHOD FOR SENSING POSITION OF A MOTORCYCLE CRANKSHAFT

TECHNICAL FIELD

The present invention relates generally to vehicle engines, and more particularly to motorcycle engines.

BACKGROUND OF THE INVENTION

In a typical v-twin engine having a dry-sump design, motor oil is pumped out of the crankcase as quickly as possible to a remotely mounted oil tank once the oil has circulated to all of the components inside the engine. The crankcase always contains some oil that is in the process of making its way to the return side of the oil pump, and some of the oil collects in the bottom of the crankcase, and some of the oil saturates the air inside the crankcase.

Magnetic sensing of the crankshaft position can be used to properly regulate fuel feed and spark timing, and the magnetic sensing can be accomplished by machining index marks into the flywheels, for example in a way that resembles paddles around a paddle wheel. Then the position of the crankshaft is determined with an electronic sensor mounted perpendicular to the crankshaft.

Such "paddles" that are cut into a flywheel will contribute to "frothing" within the crankcase. This frothing of the motor oil inside the engine has two major downsides: first, it slows the return of motor oil to the external oil tank because the oil pump cannot pump foam as quickly as it can pump liquid; and second, it creates more super-saturated mist that must be separated back into its air and oil components before allowing that air to leave the engine through its crankcase breathing system.

As seen in FIG. 1, typical prior art flywheels 23 and 24 are connected by a pin, which fits into the hole 28. The pin drives the pistons 70 and 80. When the crankshaft 30 rotates, then so will the flywheels. The flywheel 24 has teeth 40 which allow an electronic sensor 50 to monitor the motion of the flywheel. Note that the support element 52 is substantially perpendicular to the crankshaft 30. The large gap 60 typically covers an angle of thirty degrees, and this gap allows the sensor 50 to ascertain the angular position of the flywheel 24 not only when it senses the gap, but also when it senses that a particular number of teeth have passed by since the gap was sensed.

The prior art patent to Lodise (U.S. Pat. No. 6,499,341) is incorporated by reference herein. Lodise discloses a crank gear with a crankshaft passing through its center. The crank gear has paddles or "teeth," and a sensor detects the paddles as they pass by the sensor. The sensor waits until an indicator on the crank gear passes by, and then the sensor begins counting groups of paddles, and accordingly regulates fuel feed and/or spark timing based upon how many paddles have passed by the sensor. Unfortunately, this type of paddle arrangement can create frothing of the motor oil, with the resulting difficulties described above.

There are various other existing patents for flywheels, but they do not solve these problems. Thomsen (U.S. Pat. No. 6,663,789) discloses a flywheel, including a timing mark that projects from the side of the flywheel. The timing mark is alternatively a depression, such as a machined slot or void in the side of the flywheel, and a sensor detects the timing mark as it passes by. However, the Thomsen apparatus is unable to measure the rotational speed of the crankshaft at selected angular positions of the crankshaft, and those measurements are very useful for regulating fuel feed and/or spark timing.

Neither the timing mark of Thomsen nor the indicator of Lodise will cause frothing of oil. However, such frothing is caused by the paddles of Lodise, and Thomsen does not provide any components that provide the useful function performed by the paddles of Lodise.

Another relevant prior art patent is Weber (U.S. Pat. No. 6,131,547). Weber discloses a "tone wheel" which has sidewall cavities that penetrate through the wheel. Passage of the tone wheel past a sensor allows electromagnetic determination of the engine's angular position and rotational speed. However, the tone wheel of Weber is located within a gear having radial teeth, which would potentially cause frothing in a crankcase.

Bowling (U.S. Pat. No. 6,575,134) discloses a flywheel having a substantially smooth rim, and three holes in the sidewall that extend through the sidewall from one side to the other. However, Bowling does not employ those holes for monitoring motion of the flywheel. Instead, various magnets are attached to the flywheel, some of which may be attached to a sidewall of the flywheel. The magnets, rather than the three holes in the flywheel, allow the position to be sensed.

Saker (U.S. Pat. No. 6,164,159) discloses a flywheel having a smooth rim, but Saker does not disclose a sensor. The recesses and openings in the sidewall of Saker's flywheel are for receiving pins, shafts, or the like, rather than for monitoring motion of the flywheel.

Stadelmann (U.S. Pat. No. 4,235,101) discloses a "sense wheel" mounted adjacent to a flywheel. The flywheel has a smooth rim, and the flywheel also has cavities extending from one sidewall of the flywheel through to the other sidewall of the flywheel, for receiving bolts and the like. Stadelmann discloses that a sidewall of the sense wheel (rather than the flywheel) has holes, slots, indentations, protrusions, and the like, wherein as each sense feature passes near a sensor it is magnetically detected. Stadelmann mentions that these sense features could be implemented on a flange of the crankshaft.

SUMMARY OF THE INVENTION

The present approach to machining index marks into flywheels is for the purpose of sensing crankshaft position. According to the present invention, a flywheel has cavities (i.e. notches) recessed into a side of the flywheel near its rim. One of the cavities is wider than the others, and that wider cavity triggers the magnetic sensor as the flywheel rotates. These sidewall cavities minimize foaming or frothing of oil in the crankcase, which is an advantage because oil froth does not have the lubricating or cooling qualities of liquid oil. The present sidewall cavities replace grooves in the rim of a typical motorcycle flywheel, and instead the present flywheel has a smooth rim. The present flywheel is a heavy disc of metal attached to the rear of the crankshaft, serving to smooth the firing impulses of the engine, in order to keep the crankshaft turning during periods when no firing takes place, and in order to start the engine after being engaged by the starter.

The present approach to sensing the crankshaft's position relies upon notches machined into the face of the flywheel, and an electronic sensor mounted parallel (instead of perpendicular) to the crankshaft. By not using "paddles" around the circumference of the flywheel, less oil in the bottom of the crankcase is churned and mixed with air. Less churning produces less froth and mist. And by mounting the crankshaft position sensor parallel to the crankshaft, it becomes possible to penetrate the crankcase in a location that makes it easier for motorcycle builders to protect and/or conceal wiring.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

BEST MODE FOR CARRYING OUT THE INVENTION

Figure 1:
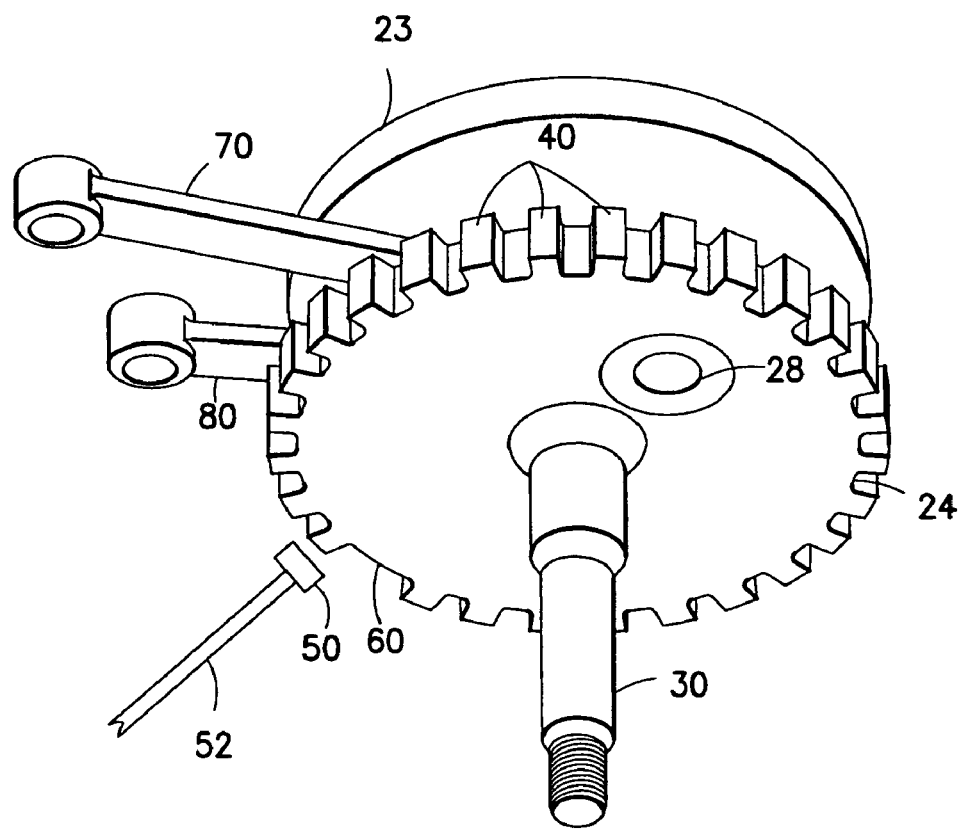
FIG. 1 is a typical prior art flywheel having teeth for being sensed by a sensor.
Figure 2:
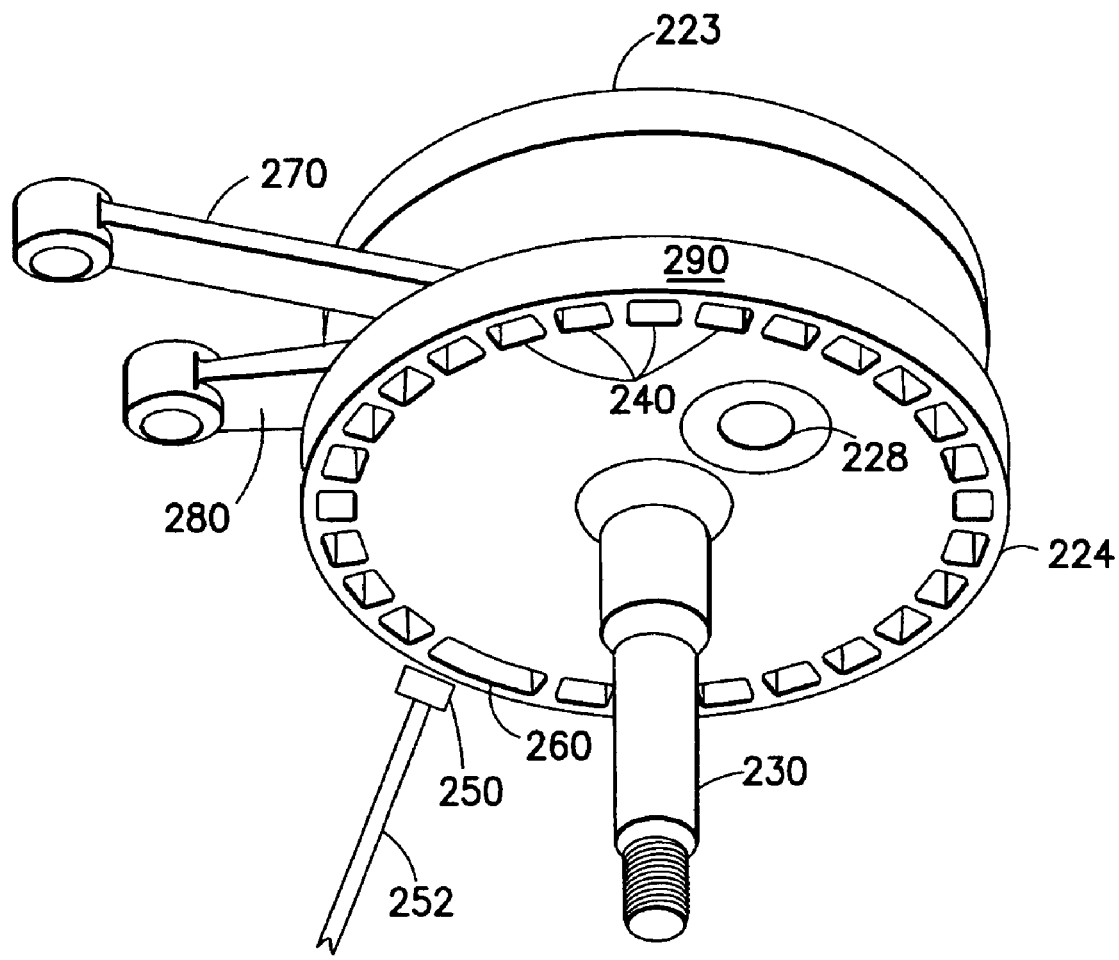
FIG. 2 is a flywheel according to the present invention, having notches instead of teeth.

The present invention can be implemented in various different embodiments, and one such is shown in FIG. 2. Flywheels 223 and 224 are connected by a pin, which fits into the hole 228. The pin drives the pistons 270 and 280. When the crankshaft 230 rotates, then so will the flywheels. The flywheel 224 has notches 240 which allow an electronic sensor 250 to monitor the motion of the flywheel. Note that the support element 252 is substantially parallel to the crankshaft 230. The large notch 260 typically covers an angle of thirty degrees, and this notch allows the sensor 250 to ascertain the angular position of the flywheel 224 not only when it senses the unusually large notch, but also when it senses that a particular number of notches have passed by since the large notch 260 was sensed.

Thus, according to the system shown in FIG. 2, the position of a motorcycle crankshaft can be sensed. The flywheel 224 is arranged perpendicularly and concentrically with respect to the crankshaft 230. The electronic sensor 250 is positioned for sensing a face of the flywheel that includes the notches. The electronic sensor is equipped to sense passage of the notches past the sensor. The flywheel has a rim 290, and the rim is toothless.

The notches are arranged on the face of the flywheel with at least one irregularity 260 that is detectable by the electronic sensor 250 when the irregularity passes by the sensor, thus establishing an angular position of the crankshaft. The irregularity preferably is one of the notches having a wider dimension than the notches adjacent.

The sensor support element 252 is substantially parallel to the crankshaft. The sensor support element also includes a wire or fiber for transmitting data from the sensor to a processor 250. The rim 290 of the flywheel is sufficiently smooth to prevent frothing or foaming of oil that comes into contact with the rim.

Figure 3:
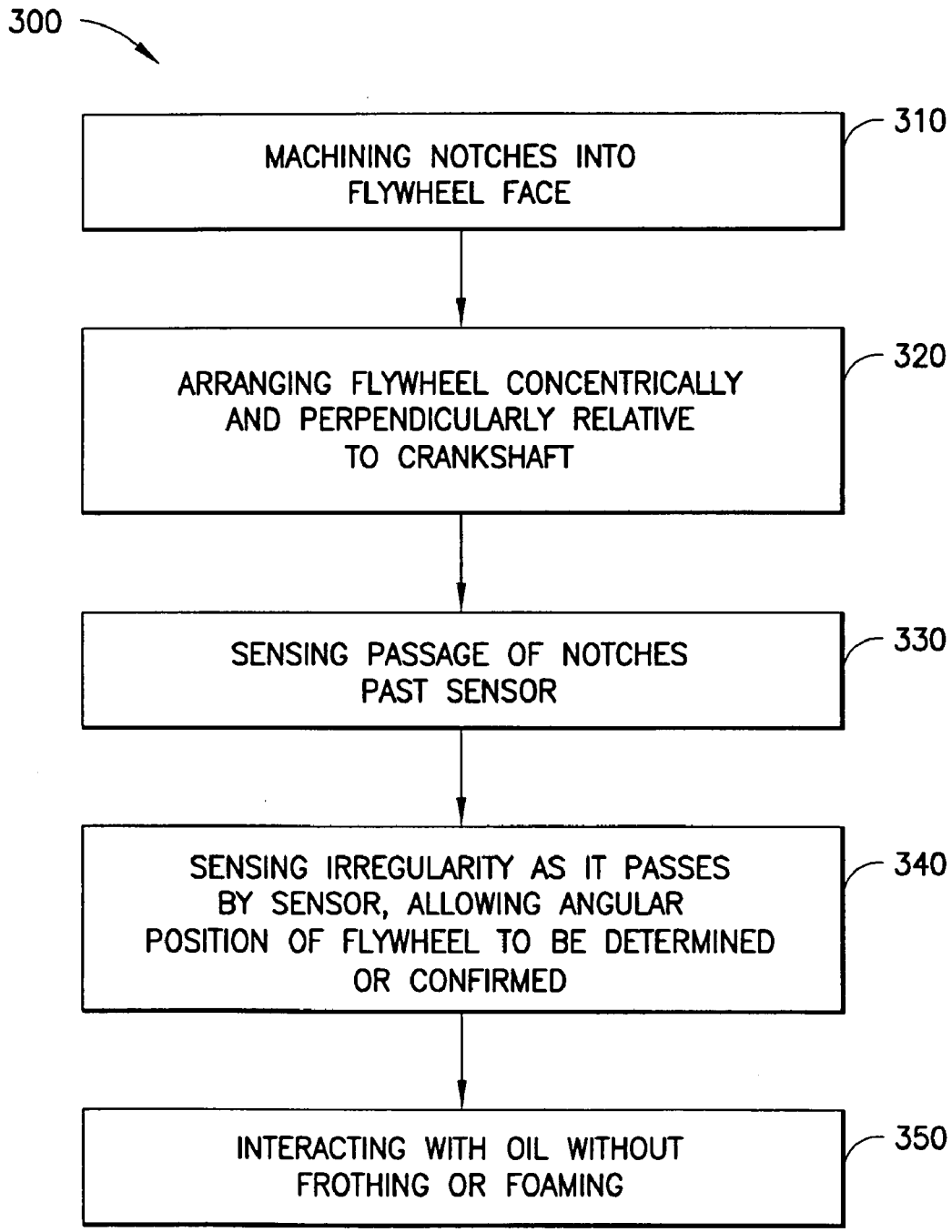
FIG. 3 is flow chart illustrating a method according to an embodiment of the present invention.

A method 300 for using the above-described system is shown in FIG. 3. A plurality of notches are machined 310 into the face of the flywheel. The flywheel is arranged 320 perpendicularly and concentrically with respect to the crankshaft, the flywheel having a substantially smooth rim. Passage of the notches past an electronic sensor is sensed 330. Likewise, an irregularity in the notches is sensed 340, for establishing an angular position of the crankshaft. The irregularity comprises, for example, one of the notches having a wider dimension than the notches adjacent. In this way, the oil can interact 350 without foaming or frothing, or at least with reduced foaming and/or frothing.

It is to be understood that all of the present figures, and the accompanying narrative discussions of best mode embodiments, do not purport to be completely rigorous treatments of the methods and systems under consideration. A person skilled in the art will understand that the steps of the present application represent general cause-and-effect relationships that do not exclude intermediate interactions of various types, and will further understand that the various structures and mechanisms described in this application can be implemented by a variety of different combinations of hardware and software, and in various configurations which need not be further elaborated herein.

What is claimed is:

1. A system for sensing position of a motorcycle crankshaft, comprising:
    a flywheel that is arranged perpendicularly and concentrically with respect to the crankshaft, and
    an electronic sensor positioned for sensing a face of the flywheel,
    wherein the face of the flywheel has a plurality of notches therein,
    wherein the electronic sensor is equipped to sense passage of the notches past the sensor,
    wherein the flywheel has a rim, and the rim is toothless,
    wherein the notches are arranged on the face of the flywheel with at least one irregularity that is detectable by the electronic sensor when the irregularity passes by the sensor, for establishing an angular position of the crankshaft,
    wherein the face of the flywheel further comprises an aperture configured to fit around a pin that is configured to drive at least one connecting rod, or vice versa, when the crankshaft rotates, and
    wherein the pin also connects the flywheel to a further flywheel, said at least one connecting rod being positioned at least between the flywheel and the further flywheel.

2. The system of claim 1, further comprising a sensor support element that is substantially parallel to the crankshaft, the sensor support element also including a wire or fiber for transmitting data from the sensor to a processor.

3. The system of claim 1, wherein the rim of the flywheel is sufficiently smooth to prevent frothing or foaming of oil that comes into contact with the rim.

4. The system of claim 1, wherein the irregularity comprises one of the notches having a wider dimension than the notches adjacent, and wherein said irregularity covers an angle substantially larger than the notches adjacent.

5. A method for sensing position of a motorcycle crankshaft, comprising:
    machining a plurality of notches in the face of a flywheel;
    arranging the flywheel perpendicularly and concentrically with respect to the crankshaft, the flywheel having a substantially smooth rim; and
    sensing passage of the notches past an electronic sensor,
    wherein the notches are arranged on the face of the flywheel with at least one irregularity that is detectable by the electronic sensor when the irregularity passes by the sensor, for establishing an angular position of the crankshaft,
    wherein the face of the flywheel further comprises an aperture configured to fit around a pin that drives at least one connecting rod, or vice versa, when the crankshaft rotates, and wherein the pin also connects the flywheel to a further flywheel, said at least one connecting rod being positioned at least between the flywheel and the further flywheel.

6. The method of claim 5, further comprising a sensor support element that is substantially parallel to the crankshaft, the sensor support element also including a wire or fiber for transmitting data from the sensor to a processor.

7. The method of claim 5, wherein the rim of the flywheel is sufficiently smooth to prevent frothing or foaming of oil that comes into contact with the rim.

8. The method of claim 5, wherein the irregularity comprises one of the notches having a wider dimension than the notches adjacent, and wherein said irregularity covers an angle substantially larger than the notches adjacent.

* * * * *